(12) United States Patent
Won et al.

(10) Patent No.: US 11,824,233 B2
(45) Date of Patent: Nov. 21, 2023

(54) METHOD AND APPARATUS FOR CONTROLLING COOLANT TEMPERATURE IN FUEL CELL SYSTEM

(71) Applicant: HYUNDAI MOBIS CO., LTD., Seoul (KR)

(72) Inventors: Jong Bo Won, Yongin-si (KR); Sung Kyung Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 174 days.

(21) Appl. No.: 17/513,041

(22) Filed: Oct. 28, 2021

(65) Prior Publication Data
US 2022/0376277 A1 Nov. 24, 2022

(30) Foreign Application Priority Data
May 21, 2021 (KR) ........................ 10-2021-0065752

(51) Int. Cl.
*H01M 8/04029* (2016.01)
*H01M 8/04007* (2016.01)
(Continued)

(52) U.S. Cl.
CPC ... *H01M 8/04029* (2013.01); *H01M 8/04067* (2013.01); *H01M 8/0494* (2013.01);
(Continued)

(58) Field of Classification Search
CPC ......... H01M 8/04029; H01M 8/04067; H01M 8/04358; H01M 8/04723; H01M 8/04768
See application file for complete search history.

(56) References Cited

U.S. PATENT DOCUMENTS

| 6,651,761 B1* | 11/2003 | Hrovat ............... B60L 15/20 165/41 |
| 2005/0257563 A1* | 11/2005 | Hoshi ............... F28D 1/0443 62/239 |
| 2022/0029182 A1 | 1/2022 | Li et al. |

FOREIGN PATENT DOCUMENTS

| CN | 111439167 A | 7/2020 |
| JP | 2002-271914 A | 9/2002 |

(Continued)

OTHER PUBLICATIONS

Extended European search report dated May 16, 2022, in counterpart European Patent Application No. 21207227.6 (8 pages in English).

(Continued)

*Primary Examiner* — Brittany L Raymond
(74) *Attorney, Agent, or Firm* — NSIP Law (57) ABSTRACT

A temperature control apparatus and method for fuel cell system, where the apparatus includes a fuel cell stack, a first pump disposed on a first cooling line, a first radiator disposed on the first cooling line, power electronic parts, a second pump disposed on a second cooling line, a second radiator disposed on the second cooling line, a cooling fan configured to blow exterior air to any one of the first radiator and the second radiator, and a controller configured to determine an RPM of the cooling fan based on a coolant temperature at an inlet of the fuel cell stack and a first exterior air temperature, to determine a target cooling performance of the plurality of power electronic parts based on power consumptions of the plurality of power electronic parts, and to determine an RPM of the second pump based on the target cooling performance of the plurality of power electronic parts, the RPM of the cooling fan, and a second exterior air temperature.

14 Claims, 7 Drawing Sheets

(51) Int. Cl.
*H01M 8/04701* (2016.01)
*H01M 8/04746* (2016.01)
*H01M 8/04858* (2016.01)

(52) U.S. Cl.
CPC ... *H01M 8/04723* (2013.01); *H01M 8/04768* (2013.01); *H01M 2250/20* (2013.01)

(56) References Cited

FOREIGN PATENT DOCUMENTS

| KR | 10-2009-0063838 A | 6/2009 |
| KR | 10-2011-0045290 A | 5/2011 |
| KR | 10-2012-0062270 A | 6/2012 |

OTHER PUBLICATIONS

Korean Office Action dated Apr. 23, 2023, in counterpart Korean Patent Application No. 10-2021-0065752 (7 pages in Korean).
Korean Office Action dated Apr. 27, 2023, in counterpart Korean Patent Application No. 10-2021-0065752 (7 pages in Korean).

\* cited by examiner

METHOD AND APPARATUS FOR CONTROLLING COOLANT TEMPERATURE IN FUEL CELL SYSTEM

CROSS-REFERENCE TO RELATED APPLICATION

This application claims the benefit under 35 U.S.C. § 119 (a) of Korean Patent Application No. 10-2021-0065752, filed in the Korean Intellectual Property Office on May 21, 2021, the entire contents of which are incorporated herein by reference for all purposes.

BACKGROUND

1. Field

The following description relates to a technology for controlling a temperature of coolant in a fuel cell system.

2. Description of Related Art

A fuel cell system may generate electric energy by using a fuel cell stack. For example, when hydrogen is used as a fuel of the fuel cell stack, it may be a measure of solving global environmental problems, and thus researches and developments on fuel cell systems have been continuously made. A fuel cell system may include a fuel cell stack that generates electrical energy, a fuel supply device that supplies a fuel (hydrogen) to the fuel cell stack, an air supply device that supplies oxygen in air, which is an oxidizer that is necessary for an electric chemical reaction, to the fuel cell stack, and a thermal management system (TMS) that removes reaction heat of the fuel cell stack to the outside, controls an operation temperature of the fuel cell stack, and performs a water management function.

The thermal management system is a kind of a cooling device that circulates an anti-freezing liquid that functions as coolant in a fuel cell stack and maintain the fuel cell stack at a proper temperature (for example, 60 to 70° C.), and may include a TMS line, in which the coolant circulates, a reservoir in which the coolant is stored, a pump that circulates the coolant, and an ion filter that removes ions included in the coolant, and a radiator that discharges the heat of the coolant to the outside. Furthermore, the thermal management system may include a heater that heats the coolant, and an air conditioning unit (for example, a heater for heating) that cools and heats an interior of a device (e.g., a vehicle) including the fuel cell system by using the coolant. The thermal management system may maintain a proper temperature of a power electronic component of the vehicle as well as the fuel cell stack.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, there is provided a temperature control apparatus for fuel cell system including a fuel cell stack, a first cooling line configured to circulate a first coolant that passes via the fuel cell stack, a first pump disposed on the first cooling line and configured to pump the first coolant, a first radiator disposed on the first cooling line and configured to cool the first coolant, a plurality of power electronic parts, a second cooling line configured to circulate a second coolant that passes via the plurality of power electronic parts, a second pump disposed on the second cooling line and configured to pump the second coolant, a second radiator disposed on the second cooling line and configured to cool the second coolant, a cooling fan configured to blow exterior air to any one or any combination of the first radiator and the second radiator, and a controller connected to the first pump, the second pump, and the cooling fan, wherein the controller is configured to determine an RPM of the cooling fan based on a coolant temperature at an inlet of the fuel cell stack and a first exterior air temperature, determine a target cooling performance of the plurality of power electronic parts based on power consumptions of the plurality of power electronic parts, and determine an RPM of the second pump based on the target cooling performance of the plurality of power electronic parts, the RPM of the cooling fan, and a second exterior air temperature.

The controller may be configured to determine the RPM of the second pump based on any one or any combination of the target cooling performance of the plurality of power electronic parts, the RPM of the cooling fan, and the second exterior air temperature, an area and a ventilation resistance of the second radiator.

The controller may be configured to measure the power consumptions of the plurality of power electronic parts, calculate heat values of the plurality of power electronic parts based on the power consumptions and inefficiencies of the plurality of power electronic parts, and determine the target cooling performance of the power electronic parts by adding the heat values of the plurality of power electronic parts.

The controller may be configured to store the RPM of the second pump and the RPM of the cooling fan, in response to cooling performances of the power electronic parts satisfying the target cooling performance of the power electronic parts at the RPM of the second pump, and increase the RPM of the second pump and the RPM of the cooling fan, in response to the cooling performances of the power electronic parts not satisfying the target cooling performance of the power electronic parts at the RPM of the second pump.

The controller may be configured to increase the RPM of the second pump, in response to the RPM of the second pump being less than a maximum RPM, and increase the RPM of the cooling fan, in response to the RPM of the second pump not being less than the maximum RPM.

The controller may be configured to determine the RPM of the cooling fan based on any one or any combination of the coolant temperature at the inlet of the fuel cell stack, the first exterior air temperature, an output of the fuel cell stack, an efficiency of the fuel cell stack, and an RPM of the first pump.

The apparatus may include a heat exchanger disposed on the first cooling line and the second cooling line, and being configured to exchange heat between the first coolant and the second coolant.

In another general aspect, there is provided a processor-implemented method for operating a fuel cell system, the method including determining an RPM of a cooling fan based on a coolant temperature at an inlet of a fuel cell stack and a first exterior air temperature, determining a target cooling performance of power electronic parts based on power consumptions of the power electronic parts, and determining an RPM of a pump configured to pump a coolant that passes via the power electronic parts based on the target cooling performance of the power electronic parts, the RPM of the cooling fan, and a second exterior air temperature.

The method may include determining the RPM of the pump based on any one or any combination of the target cooling performance of the power electronic parts, the RPM of the cooling fan, the second exterior air temperature, an area and a ventilation resistance of a radiator configured to cool the coolant.

The method may include measuring the power consumptions of the power electronic parts, calculating heat values of the power electronic parts based on the power consumptions and inefficiencies of the power electronic parts, and determining the target cooling performance of the power electronic parts by adding the heat values of the power electronic parts.

The method may include storing the RPM of the pump and the RPM of the cooling fan, in response to cooling performances of the power electronic parts satisfying the target cooling performance of the power electronic parts at the RPM of the pump, and increasing the RPM of the pump or the RPM of the cooling fan, in response to the cooling performances of the power electronic parts not satisfying the target cooling performance of the power electronic parts at the RPM of the pump.

The method may include increasing the RPM of the pump, in response to the RPM of the pump being less than a maximum RPM, and increasing the RPM of the cooling fan, in response to the RPM of the pump not being less than the maximum RPM.

The method may include determining the RPM of the cooling fan based on any one or any combination of the coolant temperature at the inlet of the fuel cell stack, the first exterior air temperature, an output of the fuel cell stack, an efficiency of the fuel cell stack, and the RPM of the pump configured to pump the coolant that passes via the fuel cell stack.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

With regard to description of drawings, the same or similar components may be marked by the same or similar reference numerals.

DETAILED DESCRIPTION

Hereinafter, various embodiments of the present disclosure will be described with reference to the accompanying drawings. Accordingly, those of ordinary skill in the art will recognize that modifications, equivalents, and/or alternatives on the various embodiments described herein can be variously made without departing from the scope and spirit of the present disclosure.

Various embodiments of the present disclosure and the terms used herein do not limit the technical features described in the present disclosure to specific embodiments, and should be construed to include various modifications, equivalents, or replacements of the embodiments. With regard to the description of drawings, similar components may be denoted by similar reference numerals. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd" or "first" and "second" may be used to simply distinguish a corresponding component from another, and does not limit the components in other aspects (e.g., an importance or an order). It is to be understood that if an element (e.g., a first element) is referred to, with or without the term "operatively" or "communicatively", as "coupled with" or "connected with", it means that the element may be coupled with the other element directly (e.g., by wire), wirelessly, or via a third element.

The term "module" used in various embodiments of the present disclosure may include a unit implemented in hardware, software, or firmware way, and for example, may be used interchangeably with the terms such as logic, a logic block, a component, or a circuit. The module may be an integral component, or a minimum unit or a part which performs one or more functions. For example, according to an embodiment, the module may be implemented in a form of an application-specific integrated circuit (ASIC).

Various embodiments of the present disclosure may be implemented by software (e.g., a program) including one or more instructions stored in a storage medium (e.g., an internal memory or an external memory) that may be read by a machine. For example, a device may call, among one or more instructions stored in a storage medium, at least one instruction, and may execute the instruction. This allows at least one function to be performed according to the called at least one instruction. The one or more instructions may include a code that is made by a compiler or a code that may be executed by an interpreter. The storage medium that may be read by a device may be provided in a form of a non-transitory storage medium. Here, the 'non-transitory storage medium' means that the storage medium is a tangible device and does not include a signal (e.g., an electromagnetic wave), and with regard to the term, a case, in which data are semi-permanently stored in the storage medium, and a case, in which data are temporarily stored in the storage medium, are not distinguished.

According to an embodiment, the methods according to various embodiments of the present disclosure may be provided to be included in a computer program product. The computer program product may be traded between a seller and a purchaser. The computer program product may be distributed in a form of a storage medium that may be read by a device (e.g., a compact disk read only memory (CD-ROM) or may be distributed (e.g., downloaded or uploaded) through an application store or directly or online between two user devices. In the online distribution, at least a portion of the computer program product may be at least temporarily stored in a storage medium, such as a server of a manufacturer, a server of an application store, or a memory of a relay server, which may be read by a device, or temporarily generated.

According to various embodiments, elements (e.g., modules or programs) of the above-described elements may include one or a plurality of entities, and some of the plurality of entities may be disposed to be separated from the other elements. According to various embodiments, among the above-described elements, one or more elements or operations may be omitted or one or more other elements or operations may be added. Alternatively or additionally, the plurality of elements (e.g., modules or programs) may be integrated into one element. In this case, the integrated elements may perform one or more functions of the elements of the plurality of elements in a way that is the same as or similar to the functions performed by the corresponding elements of the plurality of elements before the integration. According to various embodiments, the operations performed by modules, programs, or other elements may be executed sequentially, in parallel, repeatedly, or heuristically, one or more operations may be executed in another sequence or omitted, or one or more other operations may be added.

Figure 1:
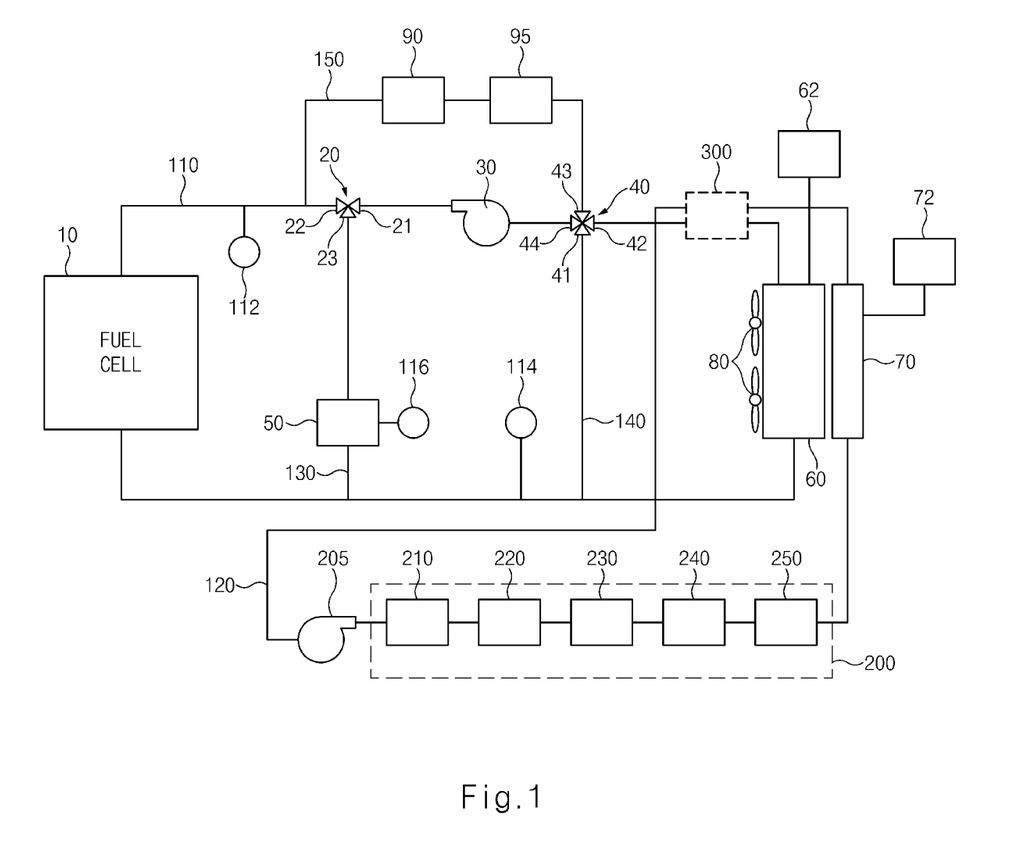
FIG. 1 illustrates a fuel cell system according to various embodiments.
Figure 2:
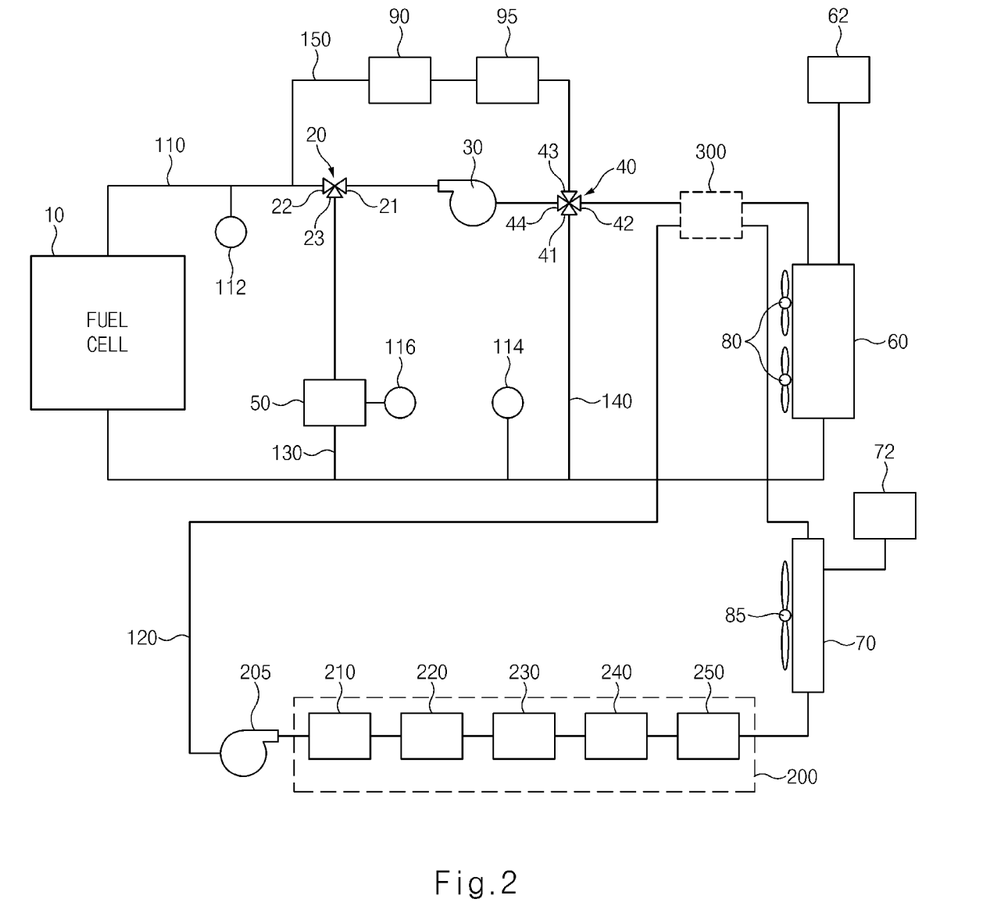
FIG. 2 illustrates a fuel cell system according to various embodiments.

FIGS. 1 and 2 illustrate a fuel cell system according to various embodiments.

Referring to FIG. 1, a fuel cell system for a vehicle may include a first cooling line 110, in which first coolant that passes via a fuel cell stack 10 of the vehicle circulates, and a second cooling line 120, in which second coolant that passes via power electronic parts of the vehicle circulates. In the embodiment, the fuel cell system may further include a heat exchanger 300 that exchanges heat between the first coolant and the second coolant, but the heat exchanger 300 may be omitted.

The fuel cell system may include a first connection line 130, a second connection line 150, and a third connection line 140 to form a heating loop (a heating circulation path) with the first cooling line 110 or form a cooling line with the first cooling line 110. The first coolant may be cooled or heated while circulating in the first connection line 130, the second connection line 150, or the third connection line 140. As an example, the first cooling line 110 may form a heating loop with the first connection line 130 and the third connection line 140 to secure a cold start capacity in an initial start condition of the vehicle, and may form a cooling loop, in which the first coolant passes through a first radiator 60 such that heat generated by the fuel cell stack 10 is emitted to the outside while driving of the vehicle. In another embodiment, when a temperature of exterior air is as high as a specific temperature, the first cooling line 110 does not form a heating loop and the fuel cell system may secure a start capacity through heat of the fuel cell stack 10. The fuel cell stack 10, a first valve 20, a first pump 30, a second valve 40, and the first radiator 60 may be disposed on the first cooling line 110, in which the first coolant circulates.

The fuel cell stack 10 (or may be referred to as a 'fuel cell') may have a structure, in which electricity may be produced through an oxidation/reduction reaction of a fuel (for example, hydrogen) and an oxidizer (for example, air). As an example, the fuel cell stack 10 may include a membrane electrode assembly (MEA), in which catalyst electrode layers for an electric chemical reaction are attached to opposite sides of a membrane with respect to an electrolyte membrane, through which hydrogen ions travel, a gas diffusion layer (GDL) that uniformly distributes reaction gases and delivers generated electrical energy, a gasket and a coupling mechanism for maintaining a tightness and a proper coupling pressure of the reaction gases and the first coolant, and a bipolar plate that causes the reaction gases and the first coolant to flow.

In the fuel cell stack 10, the hydrogen that is the fuel and the air (oxygen) that is the oxidizer are supplied to an anode and a cathode of the membrane electrode assembly though the bipolar plate, and the hydrogen may be supplied to the anode and the air may be supplied to the cathode. The hydrogen supplied to the anode is decomposed into protons and electrons by a catalyst of the electrode layers provided on opposite sides of the electrolyte membrane, and among them, only the hydrogen ions may be delivered to the cathode after selectively passing the electrolyte membrane that is a cation exchange membrane, and the electrons may be delivered to the cathode through the gas diffusion layer and the bipolar plate. In the cathode, the hydrogen ions supplied through the electrolyte membrane and the electrons delivered through the bipolar plate may meet oxygen in the air supplied to the cathode by an air supply device and generate a reaction of generating water. Then, the electrons may flow through an external wire due to the flows of the hydrogen ions, and electric currents may be generated due to the flows of the electrons.

The first valve 20 may switch a flow path of the first coolant to the first connection line 130, in which a heater 50 is disposed, or the fuel cell stack 10 on the first cooling line 110. For example, the first valve 20 may be connected to one end of the first pump 30, one end of the first connection line 130, and one end of the fuel cell stack 10 on the first cooling line 110. The first valve 20 may include various valve means that may selectively switch the flow path of the first coolant. As an example, the first valve 20 may be a 3-way valve. In this case, the first valve 20 may include a first port 21 connected to the first cooling line 110 such that the first coolant pumped by the first pump 30 is introduced therethrough, a second port 22 connected to the first cooling line 110 such that the first coolant that passes through the first valve 20 is introduced into the fuel cell stack 10, and a third port 23 connected to one end of the first connection line 130. As the second port 22 and the third port 23 of the first valve 20 are opened and closed, the flow path of the first coolant may be switched to the heater 50 of the first connection line 130 or the fuel cell stack 10. That is, when the second port 22 is opened and the third port 23 is blocked, the first coolant may be introduced into the fuel cell stack 10, and to the contrary, when the third port 23 is opened and the second port 22 is blocked, the first coolant may be introduced into the heater 50 through the first connection line 130.

The first connection line 130 may form a heating loop (a heating circulation path) with the first cooling line 110 to heat the first coolant. For example, the first coolant that flows along the first connection line 130 may be heated while passing through the heater 50 installed in the first connection line 130. One end of the first connection line 130 may be connected to the first cooling line 110 at a first point located between an outlet of the first pump 30 and the fuel cell stack 10, and another end of the first connection line 130 may be connected to the first cooling line 110 at a second point located between an inlet of the first pump 30 and the fuel cell stack 10. Here, the inlet of the first pump 30 may be defined as an inlet, through which the first coolant is introduced into the first pump 30. Furthermore, the outlet of the first pump 30 may be defined as an outlet, through which the first coolant that passed through the first pump 30 is discharged. Furthermore, a section between the outlet of the first pump 30 and the fuel cell stack 10 may be defined as a section, in which the first coolant discharged from the first pump 30 flows to a first coolant inlet (not illustrated) of the fuel cell stack 10. Furthermore, a section between the inlet of the first pump 30 and the fuel cell stack 10 may be defined as a section, in which the first coolant discharged from a coolant outlet (not illustrated) of the fuel cell stack 10 flows to the inlet of the first pump 30.

The first pump 30 may be configured to cause the first coolant to compulsorily flow. The first pump 30 may include various means that may pump the first coolant, and the kinds and the number of the first pumps 30 are not limited in the present disclosure.

The second valve 40 may switch the flow path of the first coolant to the first radiator 60 or the fuel cell stack 10 on the first cooling line 110. For example, the second valve 40 may be provided on the first cooling line 110 to be located between the first pump 30 and the first radiator 60, and may be connected to one end of the third connection line 140 and the outlet of the first radiator 60. The second valve 40 may include various valve means that may selectively switch the flow path of the first coolant to the first radiator 60 or the fuel cell stack 10. As an example, the second valve 40 may be a 4-way valve or a 3-way valve. When the second valve 40 is a 3-way valve, it may include a first port 41 connected to the third connection line 140, a second port 42 connected to the first cooling line 110 such that the first coolant that passes through the first radiator 60 is introduced therethrough, and a third port 44 connected to the first cooling line 110 such that the first coolant is introduced into the first pump 30, and when the second valve 40 is a 4-way valve, it may further include a third port 43 connected to one end of the second connection line 150. As the first port 41 or the second port 42 of the second valve 40 is opened and closed, the flow path of the first coolant may be switched to the first radiator 60 or the fuel cell stack 10. That is, when the first port 41 is opened and the second port 42 is blocked, the first coolant is introduced into the fuel cell stack 10 while not passing through the first radiator 60, and to the contrary, when the second port 42 is opened and the first port 41 is blocked, the first coolant may be introduced into the fuel cell stack 10 after passing through the first radiator 60.

The second connection line 150 may form a heating loop with the first cooling line 110 to heat an air conditioning unit (an HVAC unit) 90. As an example, the second connection line 150 may form a loop that heats a heater (not illustrated) for heating of the air conditioning unit 90. One end of the second connection line 150 may be connected to the first cooling line 110 between the first point (the point, at which one end of the first connection line 130 is connected to the first cooling line 110) and the inlet of the fuel cell stack 10, and a portion of the first coolant may circulate through the second connection line 150. Another end of the second connection line 150 may be connected to the first cooling line 110 between the first pump 30 and the second point (the point, at which another end of the first connection line 130 is connected to the first cooling line 110).

An ion filter 95 that filters ions of the first coolant that passed through the air conditioning unit 90 may be provided in the second connection line 150. Because electric currents flow in the first coolant so that the fuel cell stack 10 is short-circuited or electric currents flow toward the first coolant when an electrical conductivity of the first coolant increases due to corrosion or exudation of the system, the first coolant has to maintain a low electrical conductivity. The ion filter 95 may be configured to remove ions included in the first coolant to maintain the electrical conductivity of the first coolant at a specific level or less. In this way, during a cold start, in which the supply of the first coolant flowing to the fuel cell stack 10 is interrupted (the second port 22 of the first valve 20 is blocked), the first coolant circulates (a temperature rising loop) via the heater 50 of the first connection line 130 and also circulates along the second connection line 150, whereby filtering (removal of ions included in the first coolant) may be made possible by the ion filter 95 provided in the second connection line 150 during the cold start. Accordingly, the electrical conductivity of the first coolant introduced into the fuel cell stack 10 immediately after the cold start may be advantageously maintained at the specific level or less.

The third connection line 140 may form a cooling loop with the first cooling line 110 to cool the first coolant. As an example, one end of the third connection line 140 may be connected to the first cooling line 110 between the first pump 30 and the first radiator 60, and another end of the third connection line 140 may be connected to the first cooling line 110 between the coolant outlet of the fuel cell stack 10 and the first radiator 60.

The first radiator 60 may be configured to cool the first coolant. The first radiator 60 may have various structures that may cool the first coolant, and the kinds and structures of the first radiator 60 are not limited or restricted in the present disclosure. The first radiator 60 may be connected to a first reservoir 62, in which the first coolant is stored.

The fuel cell system may include a first temperature sensor 112 that measures a temperature of the first coolant between the fuel cell stack 10 and the first point (the first valve 20), a second temperature sensor 114 that measures a temperature of the first coolant between another end of the first connection line 130 and the first pump 30, and a third temperature sensor 116 that measures a temperature of the coolant in the heater 50. The fuel cell system may control a flow rate of the first coolant introduced into the fuel cell stack 10 based on the temperatures measured by the first temperature sensor 112, the second temperature sensor 114, and the third temperature sensor 116. As an example, when the measured temperature of the first coolant that circulates along the first cooling line 110 is lower than a preset target temperature, the flow rate of the introduced first coolant may be controlled to be lower than a preset flow rate. In this way, because the flow rate of the first coolant introduced into the fuel cell stack 10 is controlled to be low when the measured temperature of the first coolant is low, a thermal impact or deterioration of performance due to a deviation between the temperature of the first coolant staying in the interior of the fuel cell stack 10 and the temperature of the first coolant introduced into the fuel cell stack 10 may be advantageously minimized.

The second cooling line 120 passes via the power electronic parts 200, and the second coolant may circulate along the second cooling line 120. Here, the power electronic parts 200 of the vehicle may be understood as components that use a power source of the vehicle as an energy source, and the kinds and the number of the power electronic part 200 are not limited or restricted in the present disclosure. As an example, the power electronic parts 200 may include at least any one of a bi-directional high voltage DC-DC converter (BHDC) 210 provided between the fuel cell stack 10 and a high-voltage battery (not illustrated) of the vehicle, a blower pump control unit (BPCU) 220 that controls a blower (not illustrated) that supplies exterior air for driving the fuel cell stack 10, a low-voltage DC-DC converter 230 that converts a DC high-voltage received from a high-voltage battery into a DC lower-voltage, an air compressor (ACP) 240 that compresses the air supplied to the fuel cell stack 10, and an air cooler 250. Although not illustrated in FIGS. 1 and 2, the power electronic parts 200 may further include a DC-DC buck/boost converter.

A second pump 205 for causing the second coolant to compulsorily flow may be disposed on the second cooling line 120. The second pump 205 may include a pumping means that may pump the second coolant, and the kinds and the characteristics of the second pumps 205 are not limited or restricted.

A second radiator 70 for cooling the second coolant may be disposed on the second cooling line 120. The second radiator 70 may have various structures that may cool the second coolant, and the kinds and structures of the second radiator 70 are not limited or restricted. The second radiator 70 may be connected to a second reservoir 72, in which the second coolant is stored.

In the embodiment, the first radiator 60 and the second radiator 70, as illustrated in FIG. 1, may be cooled by one cooling fan 80 at the same time. As an example, the first radiator 60 and the second radiator 70 may be disposed in parallel, and the cooling fan 80 may be configured to blow the exterior air to the first radiator 60 and the second radiator 70. Because the first radiator 60 and the second radiator 70 are cooled by the one cooling fan 80 at the same time, the structure of the fuel cell system may be simplified and a degree of freedom of design and a space utility may be improved, and power consumption for cooling the first radiator 60 and the second radiator 70 may be minimized. The structure of the cooling fan 80 may be reference as a 'dual type'.

In an embodiment, as illustrated in FIG. 2, a first cooling fan 80 for cooling the first radiator 60 and a second cooling fan 85 for cooling the second radiator 70 may be disposed separately. In this case, the fuel cell system may exclude a parameter related to thermal loads of the power electronic parts 200 when an RPM of the first cooling fan 80 is controlled. The structure of the cooling fans 80 and 85 may be referenced as a 'multi-type'.

The heat exchanger 300 may be configured to exchange heat between the first coolant and the second coolant. When the heat exchanger 300 is included, the first cooling line 110 and the second cooling line 120 may constitute a thermal management system (TMS) line, in which the first coolant and the second coolant may flow while exchanging heat, and in this case, the first coolant or the second coolant may be used as a cooling medium or a heat medium on the TMS line. For example, because the temperature of the second coolant that cools the power electronic part is lower than the temperature of the first coolant that cools the fuel cell stack 10, advantageously, the fuel cell system may lower the temperature of the first coolant without increasing the capacities of the first radiator 60 and the cooling fan 80 by exchanging heat between the first coolant and the second coolant, a cooling efficiency of the fuel cell stack 10 may be improved, and safety and reliability may be improved. Furthermore, because the fuel cell system may lower the temperature of the first coolant while the vehicle (for example, a construction machine) that cannot use driving wind is stopped, advantageously, high-output driving of the fuel cell stack 10 may be secured, and safety and durability may be improved.

In the embodiment, the heat exchanger 300 may be connected to the first cooling line 110 between the outlet of the first radiator 60 and the fuel cell stack 10, and the second cooling line 120 may connect the outlet of the second radiator 70 and the power electronic parts to pass via the heat exchanger 300. For example, the first coolant may flow along the heat exchanger 300 connected to the first cooling line 110, and the second cooling line 120 may pass through an interior of the heat exchanger 300 to be exposed to the first coolant (for example, the first coolant flows along a circumference of the second cooling line 120). In this way, the fuel cell system may lower the temperature of the first coolant introduced into the fuel cell stack 10 through exchange of heat between the first coolant and the second coolant. The first temperature of the first coolant that passed through the first radiator 60 may be higher than the second temperature of the second coolant that passed through the second radiator 70, and the third temperature of the first coolant that passed through the heat exchanger 300 may be lower than the first temperature. As an example, the first temperature of the first coolant may be higher than the second temperature of the second coolant by about 10° C., and the third temperature of the first coolant that passed through the heat exchanger 300 (exchanged heat with the second coolant) may be lower than the first temperature by 1° C.

The heat exchanger 300 according to FIGS. 1 and 2 is disposed separately from the first radiator 60, but in another embodiment, the heat exchanger 300 may be directly connected to the first radiator 60. For example, the heat exchanger 300 may be connected to a specific location (a left upper end portion) of the first radiator 60, but the present disclosure is not limited thereto.

Because a vehicle, such as a construction machine, which requires an high output even when the vehicle is stopped, the fuel cell system according to the embodiments may determine the RPM of the second pump 205 in consideration of the RPM of the cooling fan 80 or 85, the exterior air temperature, and the target cooling performance of the power electric parts 200. Furthermore, because the fuel cell system may determine the RPM of the second pump 205 in consideration of at least one of the disposition of the heat exchanger 300, the structure (e.g., the dual type or the multi-type) of the cooling fan, and an amount of introduced air of the radiator 60 and 70, the cooling performance of the fuel cell system, in which the first cooling line 110 and the second cooling line 120 are present together, may be optimized.

Figure 3:
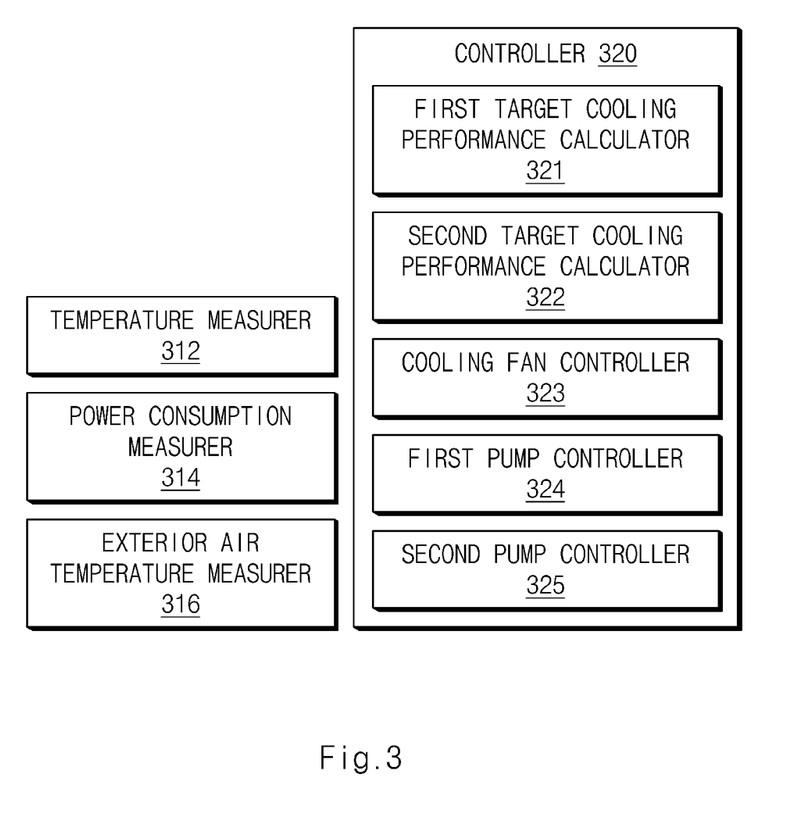
FIG. 3 illustrates a block diagram of a fuel cell system according to various embodiments.

FIG. 3 illustrates a block diagram of a fuel cell system according to various embodiments. The configuration illustrated in FIG. 3 may be a hardware device or a program (or an application) including instructions.

Referring to FIG. 3, a temperature measurer 312 may include at least one of the temperature sensors 112, 114, and 116 illustrated in FIGS. 1 and 2. The temperature measurer 312 may measure a temperature of the coolant that passes via the fuel cell stack 10 or the power electronic parts 200. A power consumption measurer 314 may measure power consumptions of the power electronic parts 200. An exterior air temperature measurer 316 may measure the exterior air temperature of the fuel cell system at a specific cycle.

A controller 320 may be a hardware device, such as a processor or a central processing unit (CPU), or a program implemented by a processor. The controller 320 may determine the RPMs of the first pump 30, the cooling fan 80 or 85, and the second pump 205 based on the information the RPM of the second pump 205 in a database. For example, the table information may be expressed in Table 1 as follows.

TABLE 1

RPM of pump (unit: rpm)

| | | Target cooling performance (kW) | | | | | | | | |
|---|---|---|---|---|---|---|---|---|---|---|
| | | 0 | | | A | | | B | | |
| | | RPM of cooling fan (rpm) | | | | | | | | |
| | | 0 | a | b | 0 | a | b | 0 | a | b |
| Exterior air temperature (° C.) | <=−10 | w −10, 0, 0 | w −10, 0, a | w −10, 0, b | w −10, A, 0 | w −10, A, a | w −10, A, b | w −10, B, 0 | w −10, B, a | w −10, B, b |
| | 0 | w0, 0, 0 | w0, 0, a | w0, 0, b | w0, A, 0 | w0, A, a | w0, A, b | w0, B, 0 | w0, B, a | w0, B, b |
| | 10 | w10, 0, 0 | w10, 0, a | w10, 0, b | w10, A, 0 | w10, A, a | w10, A, b | w10, B, 0 | w10, B, a | w10, B, b |
| | 20 | w20, 0, 0 | w20, 0, a | w20, 0, b | w20, A, 0 | w20, A, a | w20, A, b | w20, B, 0 | w20, B, a | w20, B, b |
| | 30 | w30, 0, 0 | w30, 0, a | w30, 0, b | w30, A, 0 | w30, A, a | w30, A, b | w30, B, 0 | w30, B, a | w30, B, b |
| | 40 | w40, 0, 0 | w40, 0, a | w40, 0, b | w40, A, 0 | w40, A, a | w40, A, b | w40, B, 0 | w40, B, a | w40, B, b |
| | 50 | w50, 0, 0 | w50, 0, a | w50, 0, b | w50, A, 0 | w50, A, a | w50, A, b | w50, B, 0 | w50, B, a | w50, B, b | measured through the temperature measurer 312, the power consumption measurer 314, and the exterior air temperature measurer 316. To implement this, the controller 320 may include a first target cooling performance calculator 321, a second target cooling performance calculator 322, a cooling fan controller 323, a first pump controller 324, and a second pump controller 325. The first target cooling performance calculator 321 may calculate the target cooling performance of the fuel cell stack 10 based on an output and an efficiency of the fuel cell stack 10. The second target cooling performance calculator 322 may calculate the target cooling performance of the power electronic parts 200 based on power consumptions and an inefficiency of the power electronic parts 200. The cooling fan controller 323 may determine the RPM of the cooling fan 80 or 85, the first pump controller 324 may determine the RPM of the first pump 30, and the second pump controller 325 may determine the RPM of the second pump 205. In the embodiment, the configurations included in the controller 320 may be implemented by separate modules, chips, or programs, or may be implemented by one integrated module.

Figure 4:
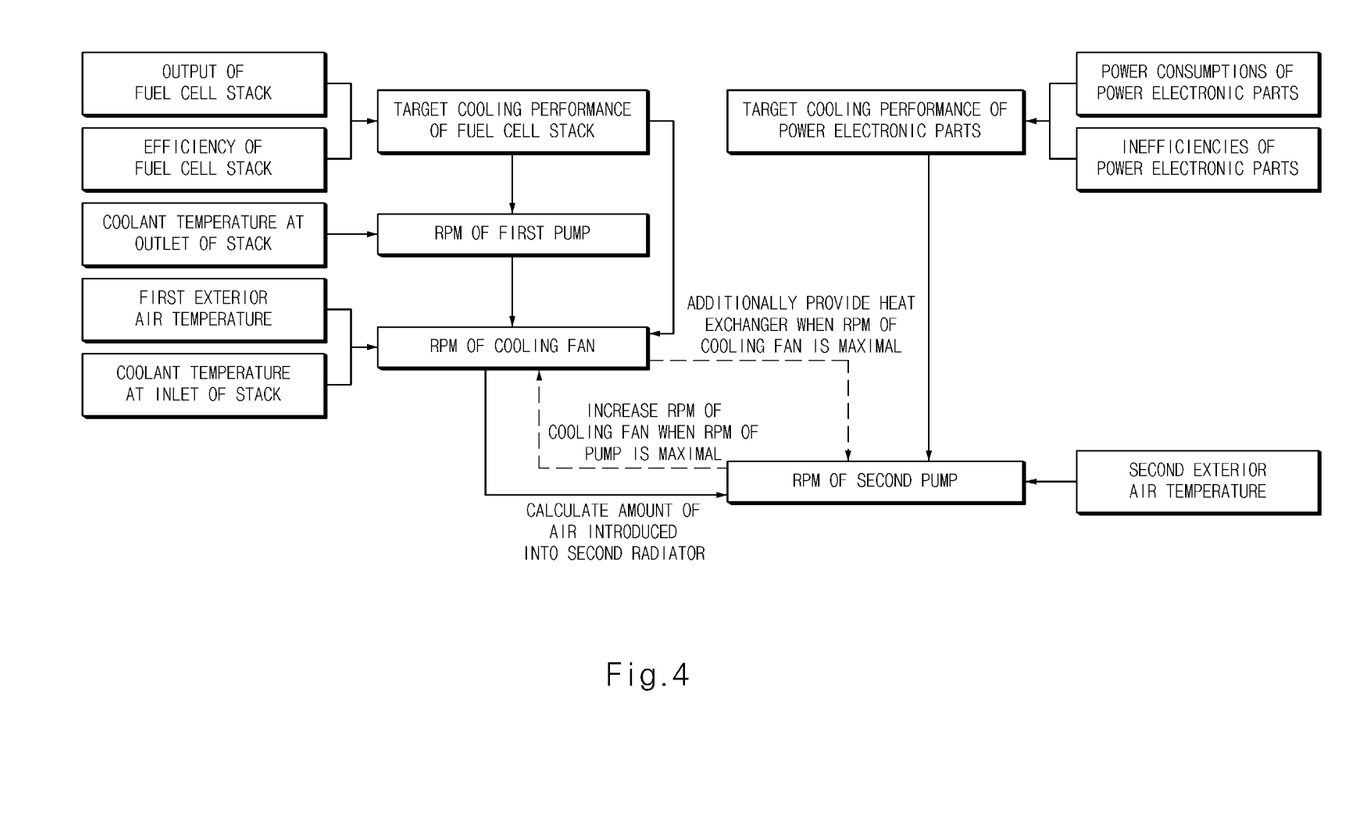
FIG. 4 illustrates operation flows of a fuel cell system for managing a temperature of a coolant according to various embodiments.

FIG. 4 illustrates operation flows of a fuel cell system for managing a temperature of a coolant according to various embodiments.

Referring to FIG. 4, the controller 320 may determine an RPM of the cooling fan 80 based on a coolant temperature at an inlet of the fuel cell stack 10 and an exterior air temperature (a first exterior air temperature), determine a target cooling performance of the power electronic parts 200 based on power consumptions of the plurality of power electronic parts 200, and determine an RPM of the second pump 205 based on an exterior air temperature (a second exterior air temperature) measured again, the RPM of the cooling fan 80, and the target cooling performance of the power electronic parts 200. The controller 320 may determine a flow rate of the second coolant for satisfying the target cooling performance of the power electronic parts 200, and may determine the RPM of the second pump 205 based on the determined flow rate. When the fuel cell system includes the multi-type cooling fan 80 and 85, the controller 320 may determine the RPM of the second pump 205 by using the RPM of the cooling fan 85.

The controller 320 may store table information (e.g., a lookup table) that represents a relationship of the target cooling performance of the power electronic parts 200, the RPM of the cooling fan 80, the exterior air temperature, and the RPM of the second pump 205 in a database. For example, the table information may be expressed in Table 1 as follows.

In Table 1, the target cooling performance and the RPM of the cooling fan may have a relationship of 0<A<B and 0<a<b. The controller 320 may set the RPM of the second pump 205 of a specific level or more to a maximum RPM because the performance of the second pump 205 is finite, and to the contrary, the controller 320 may set the RPM of the second pump 205 of the specific level or less to a minimum RPM because the cooling performance is not influenced when the second pump 205 is rotated at the specific level or less. The values that represent the exterior air temperature, the target cooling performance, and the RPM of the cooling fan are discrete, and thus the values between the values expressed in the table information may be processed through interpolation.

The controller 320 may determine the RPM of the cooling fan 80 based on at least one of the target cooling performance of the fuel cell stack 10 and the RPM of the first pump 30. In this case, the controller 320 may determine the target cooling performance of the fuel cell stack 10 based on the output and the efficiency of the fuel cell stack 10, and may determine the RPM of the first pump 30 based on the determined target cooling performance and the coolant temperature at the outlet of the fuel cell stack 10.

The controller 320 may determine the target cooling performance of the power electronic parts 200 based on power consumptions and an inefficiency of the power electronic parts 200. For example, the second target cooling performance calculator 322 may determine the target cooling performance (CP) of the power electronic parts 200 through Equation 1 as follows.

$$CP = a(\text{power}_1(1-\text{Eff}_1) + \text{power}_2(1-\text{Eff}_2) + \text{power}_3(1-\text{Eff}_3) + \ldots \text{power}_n(1-\text{Eff}_n)) \quad \text{[Equation 1]}$$

In Equation 1, $\text{power}_n$ denotes a power consumption of a configuration (e.g., 210, 220, 230, 240, and 250) of the power electronic parts 200, "$1-\text{Eff}_n$" denotes an inefficiency of the configuration of the power electronic parts 200, and "a" denotes a weight. N is a natural number, and may be changed according to the number of the configurations of the power electronic parts 200.

Because the amounts of air introduced into the radiators 60 and 70 may be different according to the areas and ventilation resistances of the radiators 60 and 70 even though the controller 320 is of a dual type, in which the radiators 60 and 70 share the cooling fan 80 are shared, the controller 320 according to the embodiments may calculate the amount of air introduced into the second radiator 70 in consideration of the RPM of the cooling fan 80 and the area and the ventilation resistance of the second radiator 70 and may determine the RPM of the second pump 205 further in consideration of the calculated amount of the introduced air.

When the RPM of the second pump 205 is maximal, the controller 320 may increase the RPM of the cooling fan 80 to secure the cooling performance of the power electronic parts 200. When the RPM of the cooling fan 80 also is maximal, the fuel cell system may further include the heat exchanger 300 to exchange heat between the first coolant and the second coolant.

Figure 5:
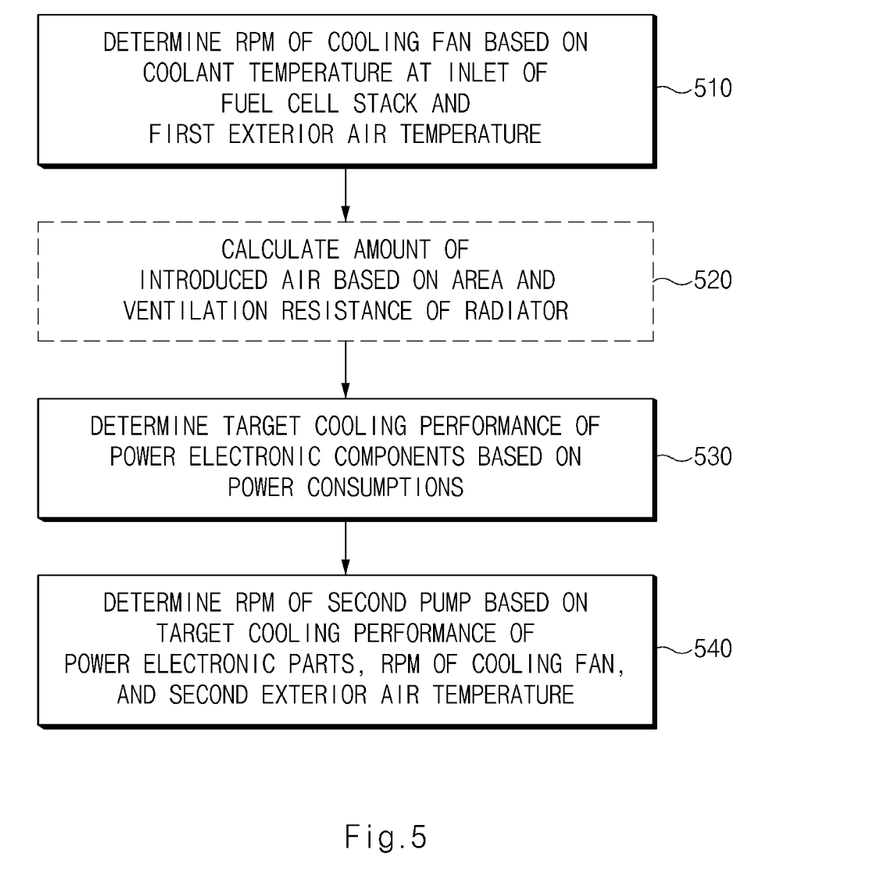
FIG. 5 illustrates a flowchart of an operation of determining an RPM of a pump according to various embodiments.

FIG. 5 illustrates a flowchart of an operation of determining an RPM of a pump according to various embodiments. The operations described hereafter may be implemented by the fuel cell system or may be implemented by the configurations (e.g., the controller 320) included in the fuel cell system.

Referring to FIG. 5, in operation 510, the controller 320 may determine an RPM of the cooling fan 80 based on a coolant temperature at the inlet of the fuel cell stack 10 and a first exterior air temperature.

In operation 520, the controller 320 may calculate an amount of air introduced into the second radiator 70 based on an area and a ventilation resistance of the second radiator 70. According to the embodiment, the controller 320 may omit operation 520.

In operation 530, the controller 320 may determine a target cooling performance of the power electronic parts 200 based on power consumptions thereof.

In operation 540, the controller 320 may determine an RPM of the second pump 205 based on the target cooling performance of the power electronic parts 200, the RPM of the cooling fan 80, and a second exterior air temperature. The second exterior air temperature may be an exterior air temperature that is measured after the first exterior air temperature is measured.

Figure 6:
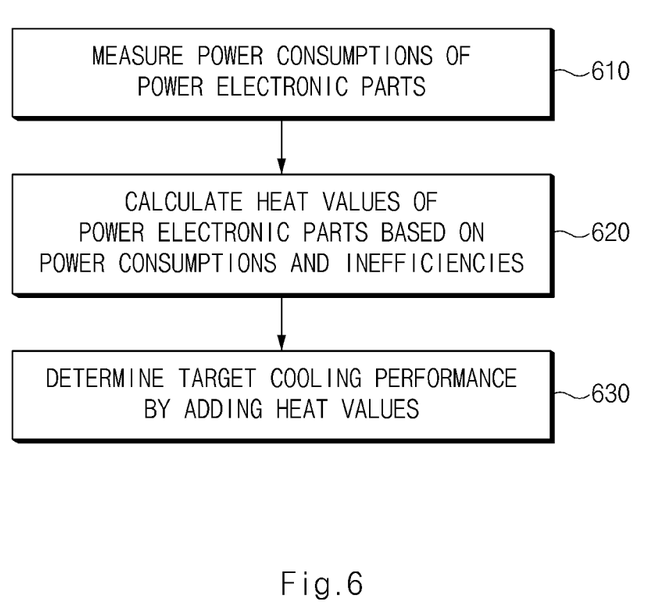
FIG. 6 illustrates a flowchart of an operation of determining a target cooling performance according to various embodiments.

FIG. 6 illustrates a flowchart of an operation of determining a target cooling performance according to various embodiments. The operations illustrated in FIG. 6 may be an example of operation 530 of FIG. 3.

Referring to FIG. 6, in operation 610, the controller 320 may measure power consumptions of the power electronic parts 200. The power electronic parts 200 may refer to a plurality of configurations, and in the case, the controller 320 may measure the power consumption of each of the plurality of power electronic parts 200.

In operation 620, the controller 320 may calculate heat value of each of the power electronic parts 200 based on the measured power consumptions and inefficiencies (1-efficiencies) of the power electronic parts.

In operation 630, the controller 320 may determine a target cooling performance of all of the power electronic parts 200 by adding the calculated heat values.

Figure 7:
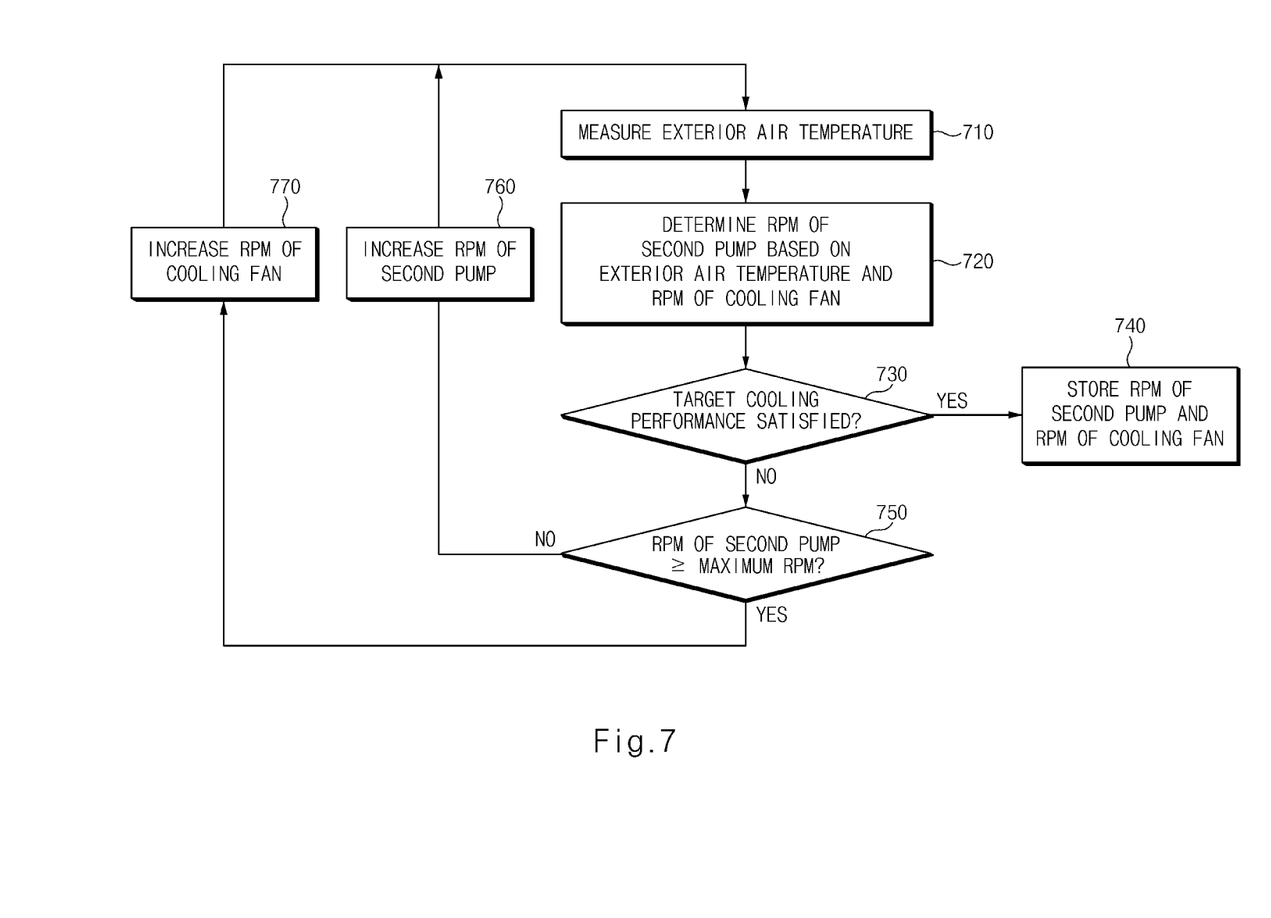
FIG. 7 illustrates a flowchart of an operation of determining an RPM of a pump and an RPM of a cooling fan according to various embodiments.

FIG. 7 illustrates a flowchart of an operation of determining an RPM of a pump and an RPM of a cooling fan according to various embodiments.

Referring to FIG. 7, in operation 710, the controller 320 may measure an exterior air temperature (e.g., the second exterior air temperature).

In operation 720, the controller 320 may determine an RPM of the second pump 205 based on the exterior air temperature and the RPM of the cooling fan 80 (e.g., operation 540 of FIG. 5).

In operation 730, the controller 320 may identify whether the cooling performances of the power electronic parts 200 satisfy the target cooling performance at the determined RPM of the second pump 205. When the cooling performances of the power electronic parts satisfy the target cooling performance, in operation 740, the controller 320 may store the determined RPM of the second pump 205 and the RPM of the cooling fan 80. The controller 320 may control operations of the second pump 205 and the cooling fan 80 based on the stored RPMs.

When the cooling performances of the power electronic parts do not satisfy the target cooling performance, in operation 750, the controller 320 may identify whether the RPM of the second pump 205 is a maximum RPM or more. When the RPM of the second pump 205 is less than the maximum RPM, in operation 760, the controller 320 may increase the RPM of the second pump 205 and repeat operations 710 to 730. When the RPM of the second pump 205 is the maximum RPM or more, in operation 770, the controller 320 may increase the RPM of the cooling fan 80 and repeat operations 710 to 730.

A vehicle including a fuel cell system requires a high output of fuel cells when the vehicle is driven, but the fuel cells may be cooled with driving wind. Meanwhile, a construction machine performs operation of leveling or loading even when it is stopped, fuel cells or power electronic parts require high outputs, but a whole cooling efficiency may be insufficient as driving wind is substantially not present. When the cooling efficiency is not sufficient, the temperature of the coolant increases, which may badly influence the safety and durability of the fuel cells and the power electronic parts. According to the embodiments of the present disclosure, the fuel cell system may secure the high output of the fuel cells and secure the safety and durability as well.

According to the embodiments of the present disclosure, the fuel cell system may secure cooling performance and prevent the life spans of the electronic parts from deteriorating by efficiently controlling management of heat of the power electronic parts.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A temperature control apparatus for fuel cell system comprising:
   a fuel cell stack;
   a first cooling line configured to circulate a first coolant that passes via the fuel cell stack;
   a first pump disposed on the first cooling line and configured to pump the first coolant;
   a first radiator disposed on the first cooling line and configured to cool the first coolant;
   a plurality of power electronic parts;

a second cooling line configured to circulate a second coolant that passes via the plurality of power electronic parts;

a second pump disposed on the second cooling line and configured to pump the second coolant;

a second radiator disposed on the second cooling line and configured to cool the second coolant;

a cooling fan configured to blow exterior air to any one or any combination of the first radiator and the second radiator; and a controller connected to the first pump, the second pump, and the cooling fan, wherein the controller is configured to:
   determine an RPM of the cooling fan based on a coolant temperature at an inlet of the first cooling line of the fuel cell stack and a first exterior air temperature;
   determine a target cooling performance of the plurality of power electronic parts based on power consumptions of the plurality of power electronic parts; and
   determine an RPM of the second pump based on the target cooling performance of the plurality of power electronic parts, the RPM of the cooling fan, and a second exterior air temperature, and
wherein a time of measurement of the first exterior air temperature is different than a time of measurement of the second exterior air temperature.

2. The fuel cell system of claim 1, wherein the controller is further configured to:
   determine the RPM of the second pump based on the target cooling performance of the plurality of power electronic parts, the RPM of the cooling fan, the second exterior air temperature, and an area or a ventilation resistance of the second radiator.

3. The apparatus of claim 1, wherein the controller is further configured to:
   measure the power consumptions of the plurality of power electronic parts;
   calculate heat values of the plurality of power electronic parts based on the power consumptions and inefficiencies of the plurality of power electronic parts; and
   determine the target cooling performance of the power electronic parts by adding the heat values of the plurality of power electronic parts.

4. The apparatus of claim 1, wherein the controller is further configured to:
   store the RPM of the second pump and the RPM of the cooling fan, in response to cooling performances of the power electronic parts satisfying the target cooling performance of the power electronic parts at the RPM of the second pump; and
   increase the RPM of the second pump and the RPM of the cooling fan, in response to the cooling performances of the power electronic parts not satisfying the target cooling performance of the power electronic parts at the RPM of the second pump.

5. The apparatus of claim 4, wherein the controller is further configured to:
   increase the RPM of the second pump, in response to the RPM of the second pump being less than a maximum RPM; and
   increase the RPM of the cooling fan, in response to the RPM of the second pump not being less than the maximum RPM.

6. The apparatus of claim 1, wherein the controller is further configured to:
   determine the RPM of the cooling fan based on the coolant temperature at the inlet of the first cooling line of the fuel cell stack, the first exterior air temperature, and any one or more of an output of the fuel cell stack, an efficiency of the fuel cell stack, or an RPM of the first pump.

7. The apparatus of claim 1, further comprising:
   a heat exchanger disposed on the first cooling line and the second cooling line, and being configured to exchange heat between the first coolant and the second coolant.

8. A processor-implemented method for operating a fuel cell system comprising a fuel cell stack and power electronic parts, the method comprising:
   determining, at a controller connected to the first pump, the second pump, and a cooling fan, an RPM of the cooling fan based on first a coolant temperature at an inlet of a first cooling line of a fuel cell stack and a first exterior air temperature;
   determining, at the controller, a target cooling performance of power electronic parts based on power consumptions of the power electronic parts; and
   determining, at the controller, an RPM of a pump configured to pump a second coolant that passes via the power electronic parts through a second cooling line based on the target cooling performance of the power electronic parts, the RPM of the cooling fan, and a second exterior air temperature,
   wherein the first cooling line is configured to circulate the first coolant that passes via the fuel cell stack,
   wherein the second cooling line is configured to circulate a second coolant that passes via the power electronic parts, and
   wherein a time of measurement of the first exterior air temperature is different than a time of measurement of the second exterior air temperature.

9. The method of claim 8, wherein the determining of the RPM of the pump comprises:
   determining the RPM of the pump based on the target cooling performance of the power electronic parts, the RPM of the cooling fan, the second exterior air temperature, and area or a ventilation resistance of a radiator configured to cool the coolant.

10. The method of claim 8, wherein the determining of the target cooling performance of the power electronic parts comprises:
    measuring the power consumptions of the power electronic parts;
    calculating heat values of the power electronic parts based on the power consumptions and inefficiencies of the power electronic parts; and
    determining the target cooling performance of the power electronic parts by adding the heat values of the power electronic parts.

11. The method of claim 8, further comprising:
    storing the RPM of the pump and the RPM of the cooling fan, in response to cooling performances of the power electronic parts satisfying the target cooling performance of the power electronic parts at the RPM of the pump; and
    increasing the RPM of the pump or the RPM of the cooling fan, in response to the cooling performances of the power electronic parts not satisfying the target cooling performance of the power electronic parts at the RPM of the pump.

12. The method of claim 11, wherein the increasing of the RPM of the pump or the RPM of the cooling fan comprises:

increasing the RPM of the pump, in response to the RPM of the pump being less than a maximum RPM; and increasing the RPM of the cooling fan, in response to the RPM of the pump not being less than the maximum RPM.

13. The method of claim 8, wherein the determining of the RPM of the cooling fan includes:

determining the RPM of the cooling fan based on the first coolant temperature at the inlet of the first cooling line of the fuel cell stack, the first exterior air temperature, and any one or more of an output of the fuel cell stack, an efficiency of the fuel cell stack, and the RPM of the pump configured to pump the coolant that passes via the fuel cell stack.

14. A non-transitory computer-readable storage medium storing instructions that, when executed by a processor, cause the processor to perform the method of claim 8.

* * * * *